US00RE34836E

United States Patent [19]

Murrell

[11] E Patent Number: Re. 34,836

[45] Reissued Date of Patent: Jan. 24, 1995

[54] EYEWEAR RETAINER

[76] Inventor: Edmond E. Murrell, 11500 NE. 76th St., A3-12, Vancouver, Wash. 98662

[21] Appl. No.: 38,678

[22] Filed: Mar. 26, 1993

Related U.S. Patent Documents

Reissue of:

[64] Patent No.: 5,002,381
Issued: Mar. 26, 1991
Appl. No.: 455,514
Filed: Dec. 21, 1989

U.S. Applications:

[63] Continuation-in-part of Ser. No. 312,889, Feb. 17, 1989, abandoned.

[51] Int. Cl.[6] ..... G02C 5/14

[52] U.S. Cl. ..... 351/123; 351/156; 351/157

[58] Field of Search ..... 351/123, 156, 157, 111; 24/3 C; 2/13, 452

[56] References Cited

U.S. PATENT DOCUMENTS

| | | | |
|---|---|---|---|
| 538,151 | 4/1895 | Bussey . | |
| 959,105 | 5/1910 | Barnes . | |
| 1,833,792 | 11/1931 | Pfaus et al. . | |
| 2,031,771 | 2/1934 | Grier | 88/52 |
| 2,172,959 | 9/1939 | Hirtenstein | 2/13 |
| 2,229,567 | 1/1941 | Hodgkins | 88/52 |
| 2,229,568 | 1/1941 | Hodgkins | 88/52 |
| 2,626,538 | 1/1953 | Frum | 88/52 |
| 3,649,106 | 3/1972 | Hirschmann, Jr. | 351/117 |
| 4,012,130 | 3/1977 | Guillet | 351/114 |
| 4,133,604 | 1/1979 | Fuller | 351/123 |
| 4,479,703 | 10/1984 | Enghofer | 351/123 |
| 4,548,484 | 10/1985 | Ehring | 351/123 |
| 4,657,364 | 4/1987 | Murrell | 351/156 |
| 4,692,002 | 9/1987 | Meistrell | 351/156 |
| 4,751,746 | 6/1988 | Rustin | 2/13 |
| 4,922,581 | 5/1990 | Wilson | 24/3 |

FOREIGN PATENT DOCUMENTS 376978 6/1922 Germany .

*Primary Examiner*—William L. Sikes
*Assistant Examiner*—Hung Xuan Dang
*Attorney, Agent, or Firm*—Chernoff, Vilhauer, McClung & Stenzel

[57] ABSTRACT

An eyewear retainer of fabric-covered elastic foam material or molded soft elastic and flexible plastic or rubber-like material, for holding eyeglasses and the like securely in place on wearer's head and providing padding for the bow portions of the eyeglasses. A pair of tubular portions fit over downwardly curved rear ends of the bows of a pair of glasses, and downwardly depending hook portions, attached to the tubular portions, fit behind a wearer's ears to retain the eyewear in place. Bending of the tubular portions causes bulging, acting as cushioning for the bows. End pieces of a strap may be attached removably to the tubular portions. The strap may be in two portions interconnected separably by mating pieces of hook-and-loop fastening material or a buckle to provide for adjustability and easy removal of glasses. A rear end portion of each tubular portion may define a number of rearwardly inclined interior circumferential ridges and grooves to provide a secure grip on the bows of a pair of glasses.

54 Claims, 4 Drawing Sheets

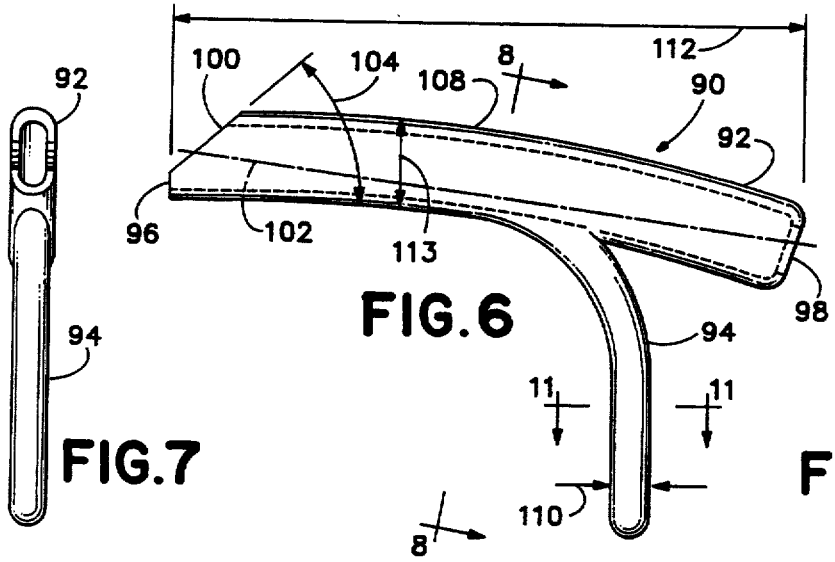
FIG.6
FIG.7
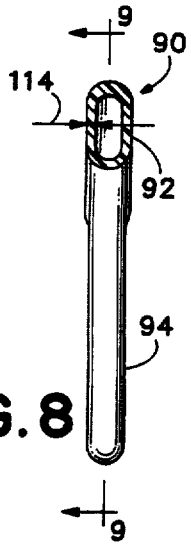
FIG.8
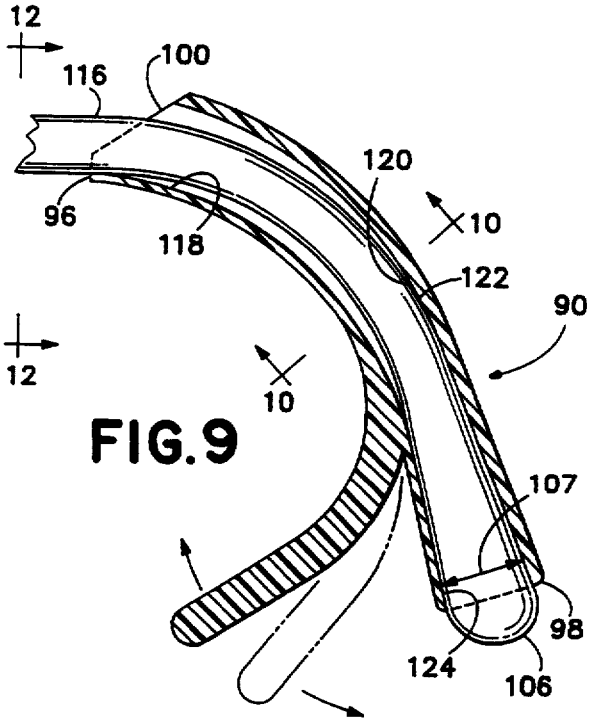
FIG.9
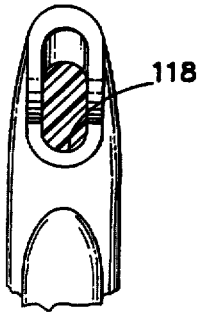
FIG.12
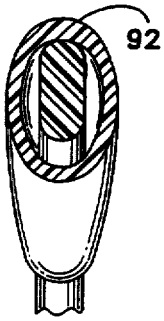
FIG.10
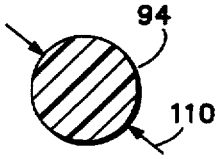
FIG.11
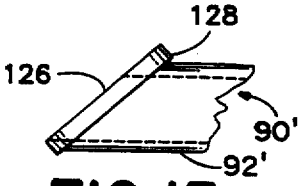
FIG.13
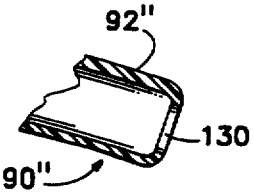
FIG.14
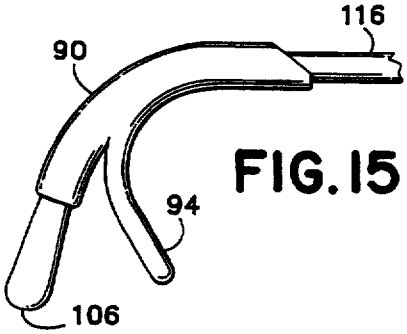
FIG.15

EYEWEAR RETAINER

Matter enclosed in heavy brackets [ ] appears in the original patent but forms no part of this reissue specification; matter printed in italics indicates the additions made by reissue.

[This application] *This application is a reissue of U.S. patent application Ser. No. 07/455,514 filed Dec. 21, 1989, now U.S. Pat. No. 5,002,381 which* is a continuation-in-part of pending U.S. patent application Ser. No. 07/312,889, filed Feb. 17, 1989, entitled Eyewear Retainer, now abandoned.

BACKGROUND OF THE INVENTION

The present invention relates to devices for holding eyeglasses and the like securely in place on a wearer's head, particularly during vigorous activity such as athletic exercise, and for retaining such eyeglasses about the person when not actually in use. In particular, this application relates primarily to such a device for glasses whose bows do not hook securely behind a wearer's ears.

Some eyeglasses are provided with bows which include resilient, downwardly curved rear end portions which hook securely about the ears of the wearer. However, many eyeglasses include bows which extend relatively straight rearwardly, including, perhaps, a downwardly slanted rear end portion which cannot securely hold such glasses in place on the wearer's head during vigorous exercise or participation in athletics.

Various devices have been used in the past to hold such eyeglasses and other eye-protective items in place more securely than is normally done merely by the bows of the eyeglasses. The previously-known devices for this purpose, however, suffer from certain shortcomings.

Some previously-known eyewear retaining devices include straps having end portions which may be attached to the bows of ordinary eyeglass frames to retain the eyeglasses on a wearer's head. Adjustability of most of such devices is provided by sliding the forward ends of the devices to the appropriate position along the bows of the glasses frames. Adjustment in this fashion may not be particularly secure for some types of glasses, and some such devices, once in place, do not permit easy removal of the glasses from the wearer's head when desired. As one example of such a device, Fuller U.S. Pat. No. 4,133,604 discloses an eyeglass retainer comprising an elastic strap having tubular end portions formed by sewing together opposite edges of the terminal portions of the strap.

Another eyewear retaining device, disclosed in Murrell U.S. Pat. No. 4,657,364, includes tubular portions which fit elastically about the rear end of each of the bows of a pair of glasses, while a short strap is attached fixedly to the top of each such tubular portion and extends rearwardly, to be fastened adjustably to the opposite strap by hook-and-loop closure materials.

While quite effective, such previous eyewear retainers are quite visible when in use, and many wearers of eyeglasses, sunglasses, sport goggles, and the like may prefer not to have visible straps extending around the rear of their heads. Additionally, the straps of eyewear retainers such as taught by Fuller and Murrell may be undesirably bulky for some users.

Enghofer U.S. Pat. No. 4,479,703, discloses eyeglass frames having included elastic cords which may be extended from the rearmost ends of the bows. Such frames, however, are not generally adaptable to existing eyeglasses, and the Enghofer device may also present the previously-mentioned disadvantage to the appearance of the wearer.

Frum, U.S. Pat. No. 2,626,538, discloses an eyeglass retaining device which provides a downward extension from the bows of a pair of glasses, but such a device may not be comfortable in use. Additionally, such a device makes intentional removal of eyewear more difficult because of the essentially immovable nature of the downward extension disclosed.

What is desired, therefore, is an improved device for retaining eyewear, which is both secure and comfortable, which is adjustable to fit the wearer's head, allows easy removal of the eyewear which does not present an undesirable appearance, and which is useful with conventional eyeglasses, sunglasses, and the like.

SUMMARY OF THE INVENTION

The present invention provides a comfortable and unobtrusive eyewear retainer which accommodates the optional use of an auxiliary strap extending behind the wearer's head for additional security, and which in one embodiment also accommodates the use of a longer flexible member as a necklace by which to suspend a pair of eyeglasses from a wearer's neck while the glasses are not actually in use.

According to the primary embodiment of the present invention, an extender is provided for the rear end of each bow of a pair of eyeglasses, safety goggles, or the like. The extender includes an elastic tubular portion that can be placed over the rear end of one of the bows of the eyeglasses. Attached to the tubular portion is an arcuately curved hook-shaped portion of soft, resilient and somewhat flexible material which extends downwardly and fits snugly around the rear of the the wearer's ear. The extender thus holds eyeglasses in place more securely than is possible using the conventional eyeglass bows alone and provides comfortable cushioning of the rear ends of the bows, while being visually unobtrusive. The extenders are of suitable material which attaches snugly and relatively securely to the ends of the bows of the eyeglasses, yet which has an outer surface which does not tangle with the wearer's hair. The extenders are of soft enough material and small enough size that they are not unduly bulky and do not press upon the wearer uncomfortably.

For example, one embodiment of the invention may be fashioned of fabric-covered, flexible elastic foam material. Suitable material of neoprene foam in sheet form and covered on each side by an adhesively attached layer of a nylon knitted fabric, such as that used for underwater swimmers' suits, is readily available. Such sheet material can be cut to shape and sewn or glued into the appropriate configuration for the tubular portion, and the hook portion can be fashioned of similar material and sewn or adhesively attached to the tubular portion of each extender. In such an embodiment of the invention, made of a fabric-covered foam material, the hook portion is attached to the tubular portion along a majority of the length of the tubular portion, holding the tubular portion in a curved configuration, with the tubular portion and the hook portion providing mutual support for each other. The elastic material of the tubular portion provides a secure grip on the bows of a pair of glasses, so that the extenders will not slide rearwardly off the bows under the forces normally encountered as a result of a wearer's participation in athletics. The tubular portion surrounding the rear end of each bow also provides some cushioning, making the bows more comfortable.

Additionally, the interior of the rearward end of each tubular portion may include one or more inwardly-directed circumferential ridges, which may be sharp-edged and rearwardly-angulated, and correspondingly-shaped grooves intermediate adjacent ridges, to provide a directionally biased shape adapted to retain the extenders in place on the bow ends.

Alternatively, extenders each having a tubular portion and a depending hook portion may be molded of a suitably soft, elastic, and flexible plastics material, whose surface texture and softness may enhance the ability of the extenders to retain the position of the eyeglass bows on a wearer's ears. Such a molded embodiment may more easily include the internal ridges and grooves in the tubular portion, as well as additional features.

For example, a strap may be provided to interconnect the extenders and thus to provide additional security to retain the eyewear on a wearer's head. Such a strap may be fixed and of a fixed length, or may be of a type including two sections adjustably connected to each other, as by the use of mating pieces of hook-and-loop fastening material or by a suitable buckle or the like. The attachment of such a strap or portion of a strap to each extender may include a suitable T-headed pin provided as a part of the shape of the extenders in an embodiment of the invention made of molded material. A mating strap tip defining an elongate hole may be provided on each end of the strap, so that the strap can be attached securely to the extenders or may be easily removed therefrom.

Additionally, an eyelet or similar point of connection may be provided on each of the extenders to attach a string or the like for use as a necklace to hold a pair of eyeglasses suspended about the wearer's neck when not actually in use.

It is therefore a principal object of the present invention to provide an improved eyewear retainer which is capable of holding eyeglasses and the like snugly and comfortably in place during use, without being obtrusively visible.

It is another important object of the present invention to provide an eyewear retainer which is easily mounted on the bows of a pair of eyeglasses or the like.

It is yet a further object of the present invention to provide an eyewear retainer which provides additionally for optional attachment of a suspension necklace, or of a strap to provide additional security for retaining eyewear.

It is a principal feature of the present invention that it includes tubular portions to be attached to the downwardly-turned rear portions of the bows of a pair of eyeglasses, while a depending hook portion attached to the tubular portion extends downwardly snugly behind the ears of the wearer to hold the eyeglasses securely and comfortably in place on the wearer's head.

It is another important feature of one embodiment of the present invention that each of the tubular portions includes at least one interior circumferential ridge to aid in retention of the tubular portion on a respective bow of a pair of eyeglasses.

It is yet a further feature of one embodiment of the present invention that it includes provision for removable attachment of a strap to each of the tubular portions, so that additional security may be provided if desired.

It is a principal advantage of a preferred embodiment of the eyewear retainer of the present invention that it is more easily concealed, behind the wearer's hair, for example, than previously available eyewear retainers.

The foregoing and other objectives, features, and advantages of the present invention will be more readily understood upon consideration of the following detailed description of the invention taken in conjunction with the accompanying drawings.

BRIEF DESCRIPTION OF THE DRAWINGS

FIG. 6 is a side view of one of a pair of extenders of an eyewear retainer which is another alternative embodiment of the present invention.

FIG. 7 is a front elevational view of the extender shown in FIG. 6.

FIG. 8 is a sectional view of the extender shown in FIG. 6, taken along line 8—8.

FIG. 9 is a sectional side view, taken along line 9—9 of FIG. 8, showing the extender shown in FIG. 6 in place upon the rearward portion of a bow of a pair of eyeglasses.

FIG. 10 is a sectional view, taken along line 10—10, showing an intermediate portion of the extender as it appears when in place on the bow of a pair of eyeglasses.

FIG. 11 is a sectional view, taken along line 11—11, of the forwardly concave hook portion of the extender shown in FIG. 6.

FIG. 12 is a view, taken along line 12—12 of FIG. 9, showing the extender shown in FIG. 6 in place on a bow of a pair of eyeglasses.

FIG. 13 is a fragmentary side view of an extender differing slightly from that shown in FIG. 6.

FIG. 14 is a sectional side view of a portion of an extender which is a slight variation of that shown in FIG. 6.

FIG. 15 is a view of an extender such as that shown in FIG. 6, in place on a bow of a pair of eyeglasses so as to reduce the effective length of the bow.

DETAILED DESCRIPTION OF THE INVENTION

Figure 1:
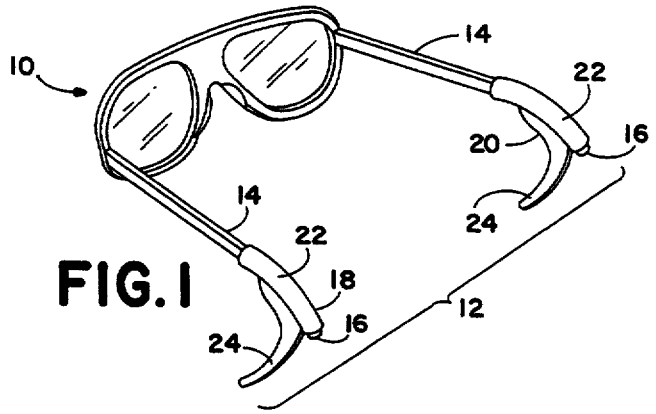
FIG. 1 is a pictorial view of a pair of eyeglasses equipped with an eyewear retainer embodying the present invention.

Referring now to the drawings, in FIG. 1 a pair of eyeglasses 10 is equipped with an eyewear retainer 12 according to the present invention. The eyeglasses 10 include a pair of bows 14, each having a downwardly curved rear end portion 16. The eyewear retainer 12 includes a pair of extenders 18, 20, which are located on the rear end portions 16. Each of the extenders 18, 20 includes an elastic tubular portion 22 which is located on and snugly grips the respective rear end portion 16. Depending downwardly from the tubular portions 22 are respective hook portions 24, which fit snugly behind the ears of a wearer, arcuately curving to present a forwardly concave profile to fit the shape of the ear and hold the eyeglasses 10 more securely in place.

Figure 3:
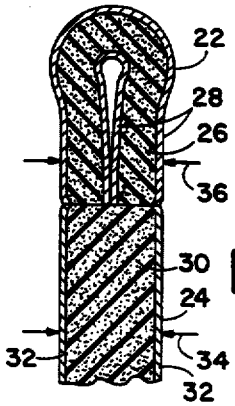
FIG. 3 is a sectional view, at an enlarged scale, taken along line 3—3, of the eyewear retainer shown in FIG. 2.
Figure 2:
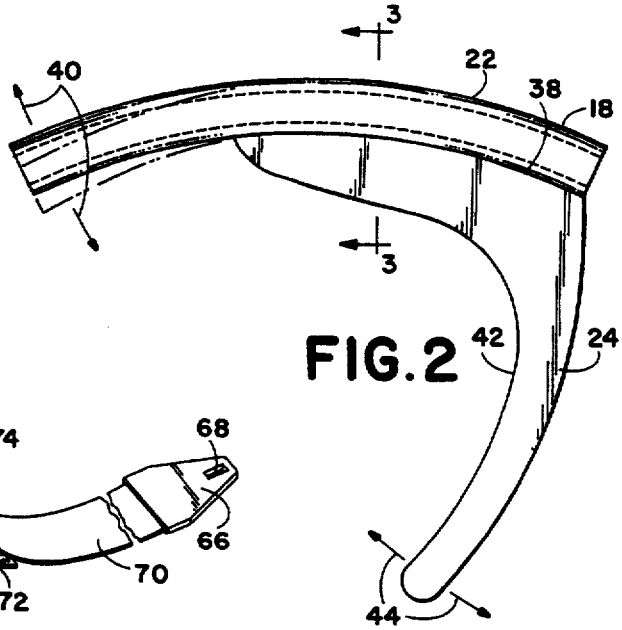
FIG. 2 is a side elevational view, at an enlarged scale, of one of a pair of extenders included in the eyewear retainer shown in FIG. 1.

Referring now also to FIGS. 2 and 3, the extender 18 is made of sheet material including a layer of a resilient, elastic, rubber-like foam such as a neoprene foam layer 26. A layer 28 of fabric such as a knit nylon fabric is attached to each side of the layer 26 by an adhesive. The sheet material, including neoprene foam layer 26, together with the fabric layers 28, is bent and secured by an adhesive, or optionally by being sewn, to form the tubular portion 22, as may be seen in section view in FIG. 3.

The hook portion 24 is formed of a material similar to that of the tubular portion 22, except that it is preferably twice as thick, having a thicker foam layer 30 and adhesively attached fabric layers 32. The thickness 34 of the hook portion 24 is, for example, about 5/32", approximately equal to the thickness 36 of the bottom of the tubular portion 22, which is adhesively attached to the top 38 of the hook portion 24.

As shown in FIG. 2, the top 38 of the hook portion 24 is preferably convexly arcuate, providing at least a slight curvature in the tubular portion 22 attached thereto, to correspond with a slight downward curvature of the rear end portions 16 of the bows of a pair of eyeglasses. The tubular portion 22, even where attached to the top 38 of the hook portions 24, is flexible enough, as indicated by the arrows 40, to bend additionally to conform to the configuration of the rear end portions of the bows 16.

A front surface 42 of the hook portion 24 is concavely arcuate, except at its front and bottom extremities, in order to fit snugly and comfortably around the ears of a wearer of the eyeglasses 10 equipped with the eyewear retainer 12 shown in FIGS. 1-3. As indicated by the arrows 44, the hook portion 24 is flexible enough to bend as necessary to fit snugly behind the wearer's ears, so that when the extenders 18 and 20 are attached to the rear end portions 16 of the bows 14 the hook portions 24 resist dislodgment of the eyeglasses 10 from the wearer's head during use, particularly during athletic exercise. The location of the extenders 18 and 20 behind a wearer's ears, however, results in the eyewear retainer 12 being unobtrusive, and in many cases being concealed by the wearer's hair.

Figure 4:
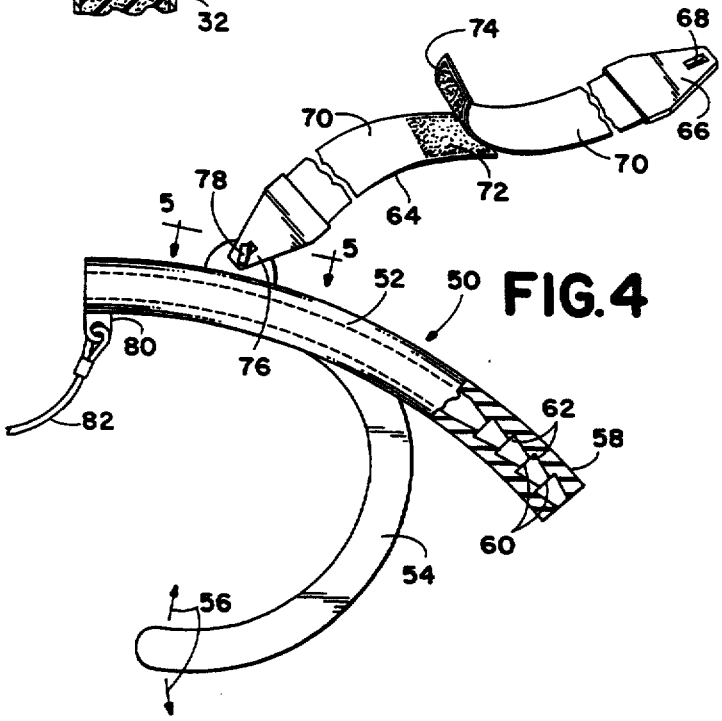
FIG. 4 is a partially cut-away side elevational view of one of a pair of extenders of an eyewear retainer which is an alternative embodiment of the present invention.

Referring now also to FIG. 4, the eyewear retainer according to the invention may include a pair of extenders 50 which are of molded construction, rather than being made up of pieces of fabric-covered foam material. Such extenders 50 are similar to each other except for being of right-hand and left-hand construction, the left-hand one of a pair being shown. Each of the extenders 50 includes a tubular portion 52 and an arcuately curved hook portion 54 which is flexible, as indicated by the arrows 56. The rearward portion 58 of the tubular portion 52 defines a plurality of radially inwardly protruding annular ridges 60 extending circumferentially about the interior of the rearward portion 58, and corresponding grooves 62 are defined between the ridges 60. The ridges 60 are directed slantingly rearward, offering greater resistance to rearward movement of the tubular portion 52 than to forward motion thereof on the rear end 16 of the eyeglasses bow. This makes it relatively easy to place the tubular portion 52 over the rear end portion 16 to install the eyewear retainer. It is intended to be relatively difficult, however, to remove each of the extenders 50 from the eyeglasses 10, so that the extenders 50 will not unintentionally slip from the rear ends 16.

Figure 5:
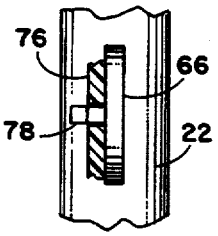
FIG. 5 is a sectional detail view, taken along line 5—5, showing the attachment of a strap to the tubular portion of the extender shown in FIG. 4.

Referring now also to FIG. 5, the extender 50 has a security strap 64 including a pair of end fittings 66, each of which defines an opening such as a slot 68 extending therethrough. Attached to each of the end fittings 66 is a length of flexible strap material 70. Mating pieces of hook-and-loop material, such as a piece of hook material 72 and a piece of loop pile material 74, which may be of the type known primarily by the trade name Velcro TM, for example, are attached to the respective pieces of strap material 70, to permit adjustment of the length of the strap 64. An attachment lug 76 extends upwardly from the top of the tubular portion 52 and has extending therefrom a connector such as a T-headed pin 78, whose size is coordinated with that of the slots 68 so that each of the end fittings 66 may be attached to the T-headed pin 78 only if the end fitting 66 is properly aligned. The strap 64 thus will not inadvertently become disconnected from the extenders 50. As will be understood, the attachment lug 76 and T-headed pin 78 will be directed oppositely in a right-hand extender 50.

An eyelet 80 is provided on the bottom of the tubular portion 52, preferably at the front end thereof. A suitably long and flexible tension-bearing member such as a string 82 or the like is attached to the eyelet 80 and is long enough to extend from the eyelet 80 on one of the extenders 52 passing first upward and around the neck of a wearer and thence downward to a similar eyelet 80 on the opposite one of the extenders 50 of a pair, as a necklace, to support a pair of glasses 10 equipped with an eyewear retainer according to the present invention. Thus, the eyeglasses 10 may be removed from the wearer's head and hung about his or her neck, ready to be replaced on the wearer's head when necessary for their use.

The extenders 50 may be molded, for example, of a suitable rubberlike thermoplastic material, such as a silicone-urethane mix, or a suitably flexible and soft vinyl material. In any case, the material should be soft and elastic and flexible enough to be attachable without too much difficulty, and must also have sufficient rigidity for the hook portions 54 to hold a pair of glasses equipped with the extenders 50 securely in place on a wearer's head by virtue of the hook portions 54.

Referring now to FIGS. 6–12, an eyewear retainer which is a further embodiment of the invention comprises a pair of similar extenders 90 of which one is shown. The extender 90 includes a tubular portion 92, from which a hook member 94 depends. The tubular portion 92 has a front end 96 and a rear end 98. Preferably the front end 96 is defined in part by a sloping margin 100 which is inclined forward and downward relative to the general lengthwise extent of the tubular portion 92 as illustrated by the longitudinal axis 102 shown in FIG. 6, forming an angle 104 of about 45 degrees, for example. The sloping front end margin 100 thereby provides a larger opening at the front end 96 of the tubular portion 92, in order to make it easier to slip the tubular portion 92 over the terminal, or rearmost portion 106 of a bow 116 of a pair of eyeglasses, where the maximum width 107 of the bow is in the rearmost portion 106.

The hook member 94 is connected with the tubular portion 92 on its lower side, merging with the tubular portion 92 in an intermediate portion 108 thereof and being arcuately curved in a downward, forwardly concave direction. As may be seen in FIG. 11, the hook member 94 is of generally circular cross section and has a diameter 110 of about 5/32 of an inch, for example.

As may be seen in FIG. 8, the tubular portion 92 defines a cross section which is an upright, elongated oval. This shape may be fairly uniform throughout the length 112 of the tubular portion 92. Preferably, the tubular portion 92 has a substantially uniform wall thickness 114 which is great enough so the tubular portion 92 is self-supporting, but not overly stiff or difficult to stretch. The precise thickness 114 will be determined, in part, by the choice of material of which the extender 90 is made. For example, a wall thickness 114 of 0.025 inch has been found satisfactory in an extender of molded rubberlike thermoplastic material. The length 112 is at least about four times as great as the height 113, shown in FIG. 6, and preferably about six times as great.

When the extender 90 is to be used it is slipped forward over the rearmost portion 106 of a bow 116 of a pair of eyeglasses to the position shown, for example, in FIG. 9, in which the rear end 98 snugly encircles the rearmost portion 106 of the bow 116. The tubular portion 92 is substantially straight, and in any case straighter than the downwardly curved rearward portion of the bow 116 when the extender 90 is separate from the bow 116, as shown in FIG. 6. Because of the sharper curvature of the downwardly curved rear end portion of the bow 116, the tubular portion 92 is forced to bend to conform to the downwardly curved portion of the bow 116, as shown in FIG. 9. This brings a lower forward portion 118 of the interior surface of the tubular portion 92 into contact with the bottom side of the bow 116, while an upper intermediate portion 120 of the interior surface of the tubular portion 92 is brought to bear against the upper surface 122 of the downwardly curved portion of the bow 116. A bottom interior surface 124 also pushes up against the bottom of the rearmost portion 106 of the downwardly curved rearward portion of the bow 116.

This forced curvature brings the bottom portion of the tubular portion 92 upward toward the upper intermediate portion 120 of the interior surface of the tubular portion 92. The sides of the tubular portion 92 are forced to bulge laterally outward as shown in FIG. 10 as a result of the tubular portion 92 being bent to conform to the downwardly curved portion of the bow 116. This lateral bulging of the tubular portion 92 provides a soft cushioning around the downwardly curved portion of the bow 116, and tends to urge the hook member 94 slightly forward.

The elastic force of the tubular portion 92 attempting to restore itself to its normal substantially straight shape shown in FIG. 6 provides pressure which helps to maintain the position of the tubular member 92 on the downwardly curved portion of the bow 116, while the elastic grip of the rear end 98 on the rearmost portion 106 also helps to retain the extender 90 in a desired position. This is particularly true in the case of a bow such as the bow 116 which has a paddle-like rearmost portion 106, but the restorative elastic force tending to return the tubular portion 92 to its normally substantially straight shape also provides a grip on such eyeglass bows which are not of the paddle-like shape shown in FIG. 9.

Preferably, the extender 90 is molded of a rubberlike synthetic plastics material which has suitable elasticity and resiliency to permit the tubular portion 92 to be stretched as necessary to slip over the rearmost portion 106 of a bow 116 and yet not be too difficult to adjust to a desired position along the bow 116. A non-slippery rubberlike material will also provide a certain amount of frictional resistance against slippage along the bow 116.

Figure 16:
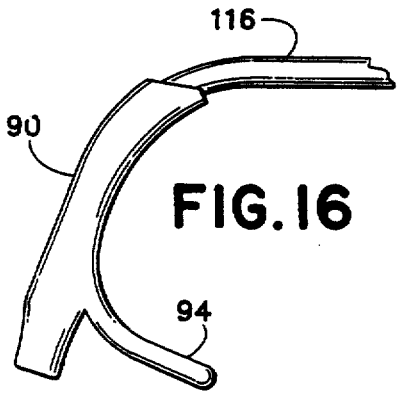
FIG. 16 is a view of an extender such as that shown in FIG. 6 in place on a bow of a pair of eyeglasses so as to extend the effective length of the bow.

An extender 90 is applied to each of the bows 116 of a pair of eyeglasses or similar eyewear and moved forward or rearward as required to provide the desired snugness of fit or extension of the length of the bows 116. Because of the forwardly concave curvature of the hook member 94, the eyewear retainer of the invention can provide a fit to retain a pair of eyeglasses or similar eyewear on the wearer's head during athletic activity or the like with greater security than is provided by the eyewear bows 116 alone. For example, as shown in FIG. 15, the extender 90 can be slid relatively far forward on the bow 116 where the bows 116 are too long for a secure fit, or if it is desired to raise the bows and thus tilt the eyewear downward. Alternatively, as shown in FIG. 16, the eyewear retainer can be adjusted relatively far rearward on the bow 116 to provide an extension, primarily downward, but also somewhat rearward. The lateral bulging of the tubular portion 92 provides increased comfort in each case.

Referring now to FIG. 13, showing a forward portion of an extender 90' which is generally similar to the extender 90, a front margin 126 includes an outwardly protruding reinforcing lip 128 to provide additional resistance against tearing of the front end of the extender 90'.

FIG. 14 shows a side sectional view of a rear end portion of an extender 90'', which is similar to the extender 90 shown in FIG. 6 in most respects. A radially inwardly directed ridge 130 is provided at the rear end of the tubular portion 92'' to provide a greater gripping strength to help retain the extender 90'' in place as desired on a bow 116 or the like.

Figure 17:
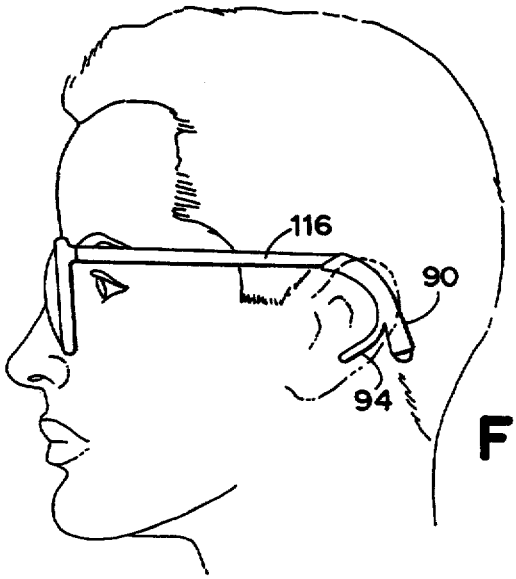
FIG. 17 is a pictorial view of the head of a person wearing a pair of eyeglasses equipped with the eyewear retainer of FIG. 6.

As shown in FIG. 17, with the eyewear retainer including extenders 90 in place on the bows 116 of a pair of eyeglasses, the hook member 94 fits comfortably and snugly behind the ear of a wearer. The tubular portion 92 provides cushioning between the wearer and the downwardly curved rearward portion of the bow 116.

*The hook member 94 extends downward and forward around the base of the ear, as shown in FIG. 17, from a point along the downwardly directed rearmost portion 106 of the bow 116. The base of the hook member 94 may be located at the rear of the ear with the extender installed on the bow 116 as shown in FIG. 15, and optionally at the middle portion of the height of the ear, as shown in FIG. 17, or even below the middle of the ear as would be the case using the retainer attached to the bow 116 as shown in FIG. 16. This, together with the length of the hook member 94, ensures that the hook member 94 can extend downwardly at least to the middle portion of the ear, and can also extend beyond the middle portion to rest snugly against a lower portion of the base of the wearer's ear. At this time, the flexibility of the hook member 94 permits the glasses to be removed without having to move the extender 90 with respect to the bow 116, while the size of the hook member 94 is large enough so that it will not cut into the wearer's skin uncomfortably.*

Figure 18:
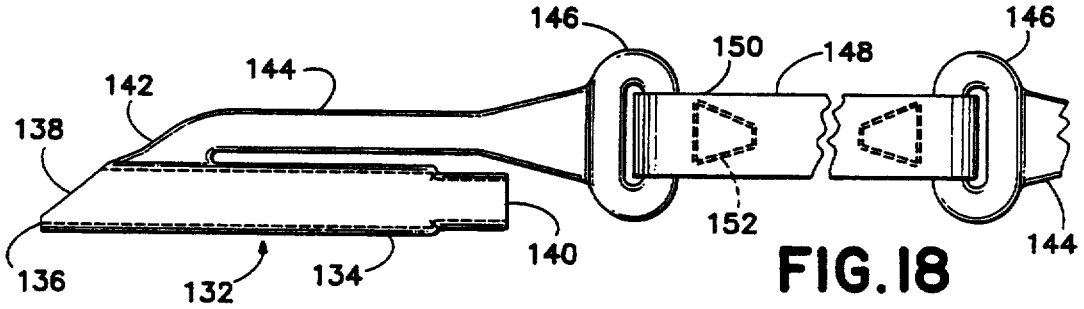
FIG. 18 is a side view of an eyewear retainer which is yet a further embodiment of the present invention.
Figure 19:
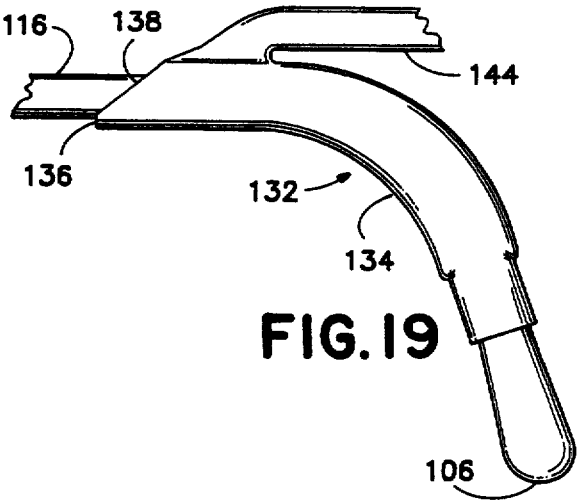
FIG. 19 is a view of a part of the eyewear retainer shown in FIG. 18 in place on a bow of a pair of eyeglasses.

In FIG. 18 a further alternative eyewear retainer according to the present invention is shown to include a grip member 132 including a tubular portion 134 which is generally similar to the tubular portion 92 of the extender 90, having a front end 136 including a sloping front margin 138. The tubular portion 134 has a rear end 140 which is necked down to a reduced size relative to the remainder of the tubular portion 134. As shown in FIG. 19, the tubular portion 134 may be placed on the downwardly curving rearmost portion 106 of a bow 116 of a pair of glasses in generally the same position in which the extender 90 is shown in FIG. 9. The curvature of the tubular portion 134 resulting from conformity to the curved portion of the bow 116 will result in a lateral bulging of the tubular portion 134 similar to that occurring in the tubular portion 92.

Extending upwardly and rearwardly from the front margin 138 is a strap attachment portion 142. A rearward extension 144 of the attachment has a rear end which is fanned out slightly and attached to a loop portion 146. A security strap 148 has an end 150 attached to the loop 146, as by being stitched to itself as at 152. An opposite end of the security strap 148 is similarly attached to a loop 146 of another grip member 132 of a pair, interconnecting the pair of grip members so that they can be mounted on the pair of bows 116 of a pair of eyeglasses or the like, with the security strap 148 extending behind the wearer's head to hold the eyeglasses in place as desired.

The reduced size of the rear end portion 140 gives that portion a tight, secure grip on the rear end of a bow to which the grip member 132 is attached. Under rearward tension in the rearward extension 144 the rear end portion 140 continues to grip the bow securely, while the tubular portion 134 ahead of the rear end 140 may bulge and resiliently allow a small amount of movement without releasing the glasses bow. This makes the eyewear retainer including the grip member 132 particularly useful for a user who prefers to leave the eyewear retainer in place on a pair of glasses without the convenience of particularly easy removal. The grip member 132 is also particularly intended for use where glasses might be subjected to being jolted or struck during athletic competition, for example.

Figure 20:
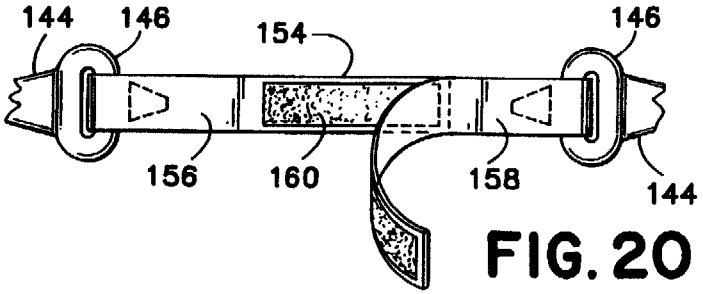
FIG. 20 is a view of a portion of an eyewear retainer similar to that shown in FIG. 18 but having an adjustable strap.

As shown in FIG. 20, a security strap 154 has a pair of separate segments 156 and 158, each of which has one of a pair of mating pieces 160 and 162 of hook-and-loop fastening material so that the length of the security strap 154 can be adjusted easily.

Figure 21:
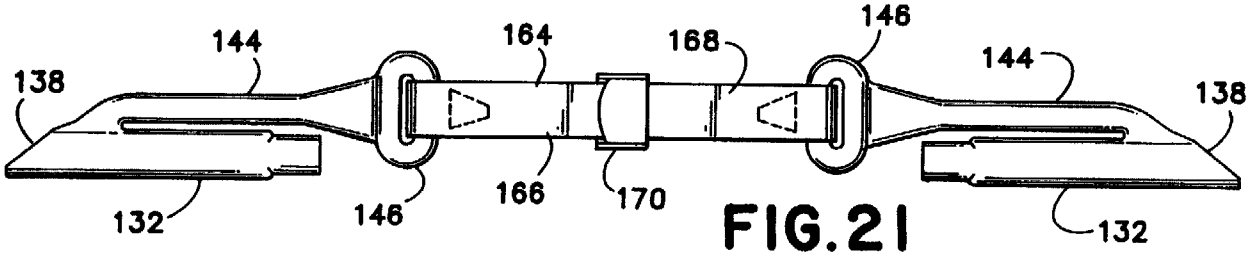
FIG. 21 is a view of an eyewear retainer similar to that shown in FIG. 18 but having an adjustable strap which is different from that of FIG. 20.

A security strap 164, as shown in FIG. 21, also has two interconnecting portions 166 and 168 which are adjustably interconnected with one another by means of a side release buckle 170 attached to the strap segments 166 and 168 by well known means.

Figure 22:
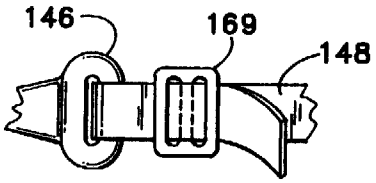
FIG. 22 is a perspective view of a different security strap length adjustment device for use with the eyewear retainer of the invention.

As shown in FIG. 22 the security strap 148 may be attached adjustably to the loop portion 146 by the use of a three-bar slide 169 to fasten the end of the security strap to the portion extending toward the other of a pair of eyewear retainers. The three-bar slide 169 may be of a suitably strong plastic, and permits adjustment of the effective length of the strap 148.

A slightly different type of fastener is the slide fastener 171 which surrounds and grips a doubled portion of a security strap 148 extending between the ones of a pair of devices such as eyewear retainers 132 to adjust the effective length of the security strap 148 by forming an adjustable loop 173 therein. A pair of fingers 175 prevent the loop 173 from being accidentally removed from the slide fastener 171.

Figure 24:
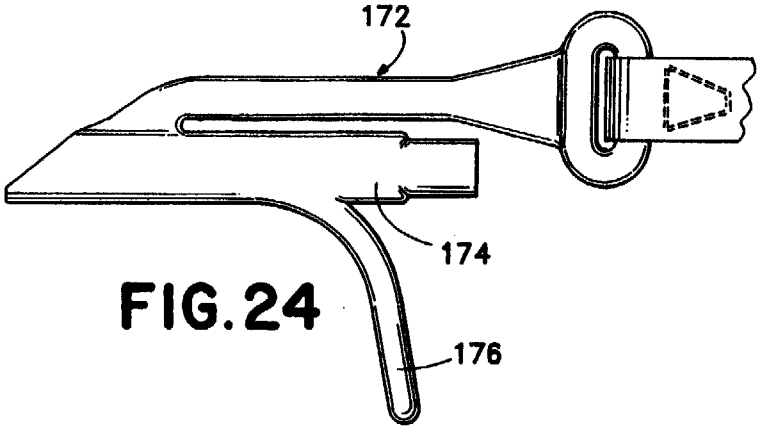
FIG. 24 is a side view of an eyewear retainer which is yet a further embodiment of the present invention.
Figure 23:
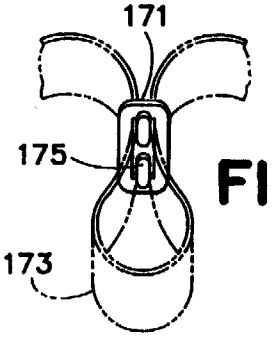
FIG. 23 is a perspective view of yet another device for adjusting a retaining strap for an eyewear retainer according to the invention.

Referring to FIG. 24, an extender 172 includes a tubular portion 174 and a depending hook member 176. The extender 172 thus is essentially a combination of features of the grip member 132 and the hook member 94 of the extender 90, so that an eyewear retainer comprising a pair of extenders 172 includes both the security strap features of the grip 132 and the adjustably positionable hook of the extender 90.

The terms and expressions which have been employed in the foregoing abstract and specification are used therein as terms of description and not of limitation, and there is no intention in the use of such terms and expression of excluding equivalents of the features shown and described or portions thereof, it being recognized that the scope of the invention is defined and limited only by the claims which follow.

What is claimed is:

1. An eyewear retainer for use with eyewear including a pair of bows which extend rearwardly and include respective downwardly curved terminal portions, the eyewear retainer comprising:

an extender of resiliently flexible and elastic rubber-like material, attachable in a selected position on a respective one of the pair of bows, said extender including an elongate tubular portion adapted to fit around said terminal portion, said tubular portion having a front end and a rear end, said extender further having hook means, including flexible elongate forwardly concave hook member means, attached to and depending downwardly from said tubular portion at a location spaced apart from said front end thereof, for fitting behind a wearer's ear and resiliently holding said eyewear securely in place while being flexible enough to bend resiliently and facilitate removal of said eyewear when desired.

2. The eyewear retainer of claim 1 wherein said tubular portion is at least four times as long as its own greatest transverse dimension.

3. The eyewear retainer of claim 1 wherein said tubular portion is substantially straight when not bent by said downwardly curved terminal portion of said bow.

4. The eyewear retainer of claim 1 wherein said tubular portion includes thin wall means for causing said tubular portion to bulge laterally when bent to conform to said downwardly curved terminal portion of said respective one of said bows.

5. The eyewear retainer of claim 1 wherein said tubular portion of said extender includes a radially inwardly projecting circumferential ridge adjacent said rear end thereof.

6. The eyewear retainer of claim 1, including a front margin which is slanted diagonally downward and forward, defining an opening at said front end of said tubular portion.

7. The eyewear retainer of claim 6 wherein said tubular portion has a layer of textile fabric as an outer surface thereof.

8. The eyewear retainer of claim 1 wherein said resiliently flexible and elastic material is a rubberlike foam.

9. The eyewear retainer of claim 1 wherein said extender is of a molded plastics material.

10. The eyewear retainer of claim 1, including a pair of said extenders and a security strap having a pair of ends, each of said ends being attached to a respective one of said extenders.

11. The eyewear retainer of claim 10 wherein said ends of said security strap include means for removably attaching each of said ends to a respective one of said extenders.

12. The eyewear retainer of claim 10 wherein said security strap is of adjustable length.

13. The eyewear retainer of claim 12 wherein said security strap includes a pair of longitudinally overlapping parts each provided with a respective one of a pair of mating pieces of hook-and-loop fastening material.

14. The eyewear retainer of claim 12 including slide means attached to said security strap for adjusting the effective length thereof.

15. The eyewear retainer of claim 10 wherein said security strap includes a pair of parts, each including a respective one of said ends, and buckle means for selectively interconnecting said parts.

16. The eyewear retainer of claim 1, including a pair of said extenders, each including means for defining a point of attachment for receiving an elongate necklace portion.

17. An eyewear retainer for use with eyewear including a pair of bows which extend rearwardly and include respective downwardly curved terminal portions, the eyewear retainer comprising:

an extender of resiliently flexible and elastic material, attachable in a selected position on a respective one of the pair of bows, said extender including a tubular portion adapted to fit around said terminal portion, said tubular portion having a front end and a rear end, wherein at least an intermediate portion of said tubular portion has a thin wall and an upright oval cross-sectional shape when said extender is separate from said bow, said intermediate portion of said tubular portion defining means for assuming a laterally outwardly bulging shape when said tubular portion is bent to conform to said terminal portion of said respective one of said bows when said extender is in place thereon, said extender further having hook means, including a flexible elongate forwardly concave hook member attached to and depending downwardly from said tubular portion at a location spaced apart from said front end thereof, for fitting behind a wearer's ear and holding said eyewear securely in place.

18. The eyewear retainer of claim 17 wherein said thin wall is of substantially uniform thickness throughout at least said intermediate portion of said tubular portion.

19. In combination with eyewear including a pair of bows extending rearwardly and including respectively downwardly curved paddle-like terminal portions, an eyewear retainer comprising:

an extender of resiliently flexible and elastic material, attachable in a selected position on a respective one of said pair of bows, said extender including an elongate tubular portion, said tubular portion having a front end and a rear end and being straighter than said downwardly curved terminal portion, said extender further having hook means, including a flexible elongate forwardly concave hook attached to and depending downwardly from said tubular portion and located rearward of and spaced apart from said front end thereof, for fitting behind a wearer's ear and resiliently holding eyewear securely in place while being flexible enough to bend resiliently and facilitate removal of said eyewear when desired, wherein said terminal portion has a maximum width adjacent its rearward extremity and said tubular portion elastically grips said terminal portion adjacent the rearward extremity thereof, and wherein said tubular portion has an upper intermediate interior surface and a lower front interior surface which are resiliently biased into contact with said respective one of said bows as a result of said tubular portion bending to conform to said downwardly curved terminal portion, said tubular portion thereby gripping said downwardly curved terminal portion of said respective one of said bows to hold said extender in a desired position thereon.

20. The eyewear retainer of claim 19 wherein said tubular portion is of rubberlike material which is nonslippery with respect to the surface of said bow.

21. The eyewear retainer of claim 19 wherein at least an intermediate portion of said tubular portion has a thin wall and an upright oval cross-sectional shape when said extender is separate from said respective one of said bows, and wherein at least said intermediate portion of said tubular portion assumes a laterally outwardly bulging shape when said tubular portion is bent to conform to said terminal portion of said respective one of said bows when said extender is in place on said bow.

22. The eyewear retainer of claim 19 wherein said tubular portion includes thin wall means for causing said tubular portion to bulge laterally when bent to conform to said downwardly curved terminal portion of said respective one of said bows, and including a front margin which is slanted diagonally downward and forward, defining an opening large enough to receive said paddle-like terminal portion, at said front end of said tubular portion.

23. The eyewear retainer of claim 19 wherein said tubular portion is at least four times as long as its own greatest transverse dimension.

24. An eyewear retainer for use with eyewear including a pair of bows which extend rearwardly and include respective downwardly curved terminal portions, the eyewear retainer comprising:

(a) a grip member molded of resiliently flexible and elastic rubberlike material and attachable in a selected position on a respective one of the pair of bows, said grip member including a tubular portion adapted to fit around said terminal portion, said tubular portion having a front end and a rear end and being straighter than said downwardly curved terminal portion;

(b) integrally-molded strap attachment means including an elongate member interconnected with and extending diagonally upward and thence rearward from said front end of said tubular portion and generally parallel therewith, for receiving a strap to interconnect said grip member with another grip member; and (c) strap means interconnecting said strap attachment means with another grip member for extending about the head or neck of a person to retain eyewear to which said eyewear retainer is attached.

25. The eyewear retainer of claim 24 wherein said tubular portion has a front margin which is slanted diagonally downward and forward, defining an opening at said front end of said tubular portion, and wherein said resiliently flexible material is a rubberlike foam.

26. The eyewear retainer of claim 24 wherein said tubular portion includes thin wall means for causing said tubular portion to bulge laterally when bent to conform to said downwardly curved terminal portion of said respective one of said bows.

27. The eyewear retainer of claim 24 wherein at least an intermediate portion of said tubular portion has a thin wall and an upright oval cross-sectional shape when said extender is separate from said bow, and wherein at least said intermediate portion of said tubular portion assumes a laterally outwardly bulging shape when said tubular portion is bent to conform to said terminal portion of said bow when said extender is in place on said bow.

28. An eyewear retainer comprising:

(a) an extender for each of a pair of rearwardly-extending bows of a pair of eyewear, each extender including a flexible and elastic tubular portion adapted to fit on a respective one of said bows, and forwardly concave hook means attached to said tubular portion and depending downwardly therefrom for fitting behind a wearer's ear and holding a pair of eyewear with added security;

(b) a security strap having a pair of ends, each of said ends including an end piece defining an opening; and (c) projecting pin means included on each of said extenders, for engaging said opening in a respective one of said end pieces, each of said ends thereby being removably attached to a respective one of said extenders.

29. An eyewear retainer, comprising:

(a) an extender for each of a pair of rearwardly-extending bows of a pair of eyewear, each extender including a flexible and elastic tubular portion adapted to fit on a respective one of said bows, said tubular portion having a rearward portion;

(b) a plurality of radially inwardly projecting circumferential ridges being included in said rearward portion;

(c) at least one circumferential groove being defined between said ridges; and (d) forwardly concave hook means attached to said tubular portion and depending downwardly therefrom for fitting behind a wearer's ear and holding a pair of eyewear with added security.

30. An eyewear retainer, comprising:

(a) an extender for each of a pair of rearwardly-extending bows of a pair of eyewear, each extender including a flexible and elastic tubular portion adapted to fit on a respective one of said bows, said tubular portion having a rearward portion;

(b) a plurality of radially inwardly projecting circumferential ridges included in said rearward portion, each of said ridges being rearwardly biased and elastic, so as to resist rearward movement of said tubular portion along a rearwardly-extending bow of a pair of eyewear;

(c) at least one circumferential groove defined between said ridges; and (d) forwardly concave hook means attached to said tubular portion and depending downwardly therefrom for fitting behind a wearer's ear and holding a pair of eyewear with added security.

31. The eyewear retainer of claim 24 wherein a portion of said tubular portion adjacent said rear end thereof is necked down to a reduced size relative to the remainder of said tubular portion.

*32. An eyewear retainer for use with eyewear including a pair of bows which extend rearwardly and include respective downwardly curved terminal portions, the eyewear retainer comprising:*

*an extender of resiliently flexible and elastic rubberlike material, attachable in a selected position on a respective one of the pair of bows, said extender including an elongate tubular portion adapted to fit around said terminal portion, said tubular portion having a front end and a rear end, said extender further having hook means, including flexible elongate forwardly concave hook member means, attached to and depending downwardly from said tubular portion, for fitting behind a wearer's ear and resiliently holding said eyewear securely in place while being flexible enough to bend resiliently and facilitate removal of said eyewear when desired.*

*33. The eyewear retainer of claim 32 wherein said tubular portion is at least four times as long as its own greatest transverse dimension.*

*34. The eyewear retainer of claim 32 wherein said tubular portion is substantially straight when not bent by said downwardly curved terminal portion of said bow.*

*35. The eyewear retainer of claim 32 wherein said tubular portion includes thin wall means for causing said tubular portion to bulge laterally when bent to conform to said downwardly curved terminal portion of said respective one of said bows.*

*36. The eyewear retainer of claim 32 wherein said tubular portion of said extender includes a radially inwardly projecting circumferential ridge adjacent said rear end thereof.*

*37. The eyewear retainer of claim 32, including a front margin which is slanted diagonally downward and forward, defining an opening at said front end of said tubular portion.*

*38. The eyewear retainer of claim 37 wherein said tubular portion has a layer of textile fabric as an outer surface thereof.*

*39. The eyewear retainer of claim 32 wherein said resiliently flexible and elastic material is a rubberlike foam.*

*40. The eyewear retainer of claim 32 wherein said extender is of a molded plastics material.*

*41. The eyewear retainer of claim 32, including a pair of said extenders and a security strap having a pair of ends, each of said ends being attached to a respective one of said extenders.*

*42. The eyewear retainer of claim 41 wherein said ends of said security strap include means for removably attaching each of said ends to a respective one of said extenders.*

*43. The eyewear retainer of claim 41 wherein said security strap is of adjustable length.*

*44. The eyewear retainer of claim 43 wherein said security strap includes a pair of longitudinally overlapping parts each provided with a respective one of a pair of mating pieces of hook-and-loop fastening material.*

*45. The eyewear retainer of claim 43, including slide means attached to said security strap for adjusting the effective length thereof.*

*46. The eyewear retainer of claim 41 wherein said security strap includes a pair of parts, each including a respective one of said ends, and buckle means for selectively interconnecting said parts.*

*47. The eyewear retainer of claim 32, including a pair of said extenders, each including means for defining a point of attachment for receiving an elongate necklace portion.*

*48. The eyewear retainer of claim 32 wherein said hook member means is long enough to extend downwardly at least behind a middle portion of said wearer's ear.*

*49. The eyewear retainer of claim 48 wherein said hook member means is long enough to extend downwardly beyond said middle portion of said wearer's ear and rest snugly against a lower portion of the base of said wearer's ear.*

*50. In combination with eyewear including a pair of bows extending rearwardly and including respectively downwardly curved paddle-like terminal portions, an eyewear retainer comprising:*

*an extender of resiliently flexible and elastic material, attachable in a selected position on a respective one of said pair of bows, said extender including an elongate tubular portion, said tubular portion having a front end and a rear end and being straighter than said downwardly curved terminal portion, said extender further having hook means, including a flexible elongate forwardly concave hook attached to and depending downwardly from said tubular portion, for fitting behind a wearer's ear and resiliently holding eyewear securely in place while being flexible enough to bend resiliently and facilitate removal of said eyewear when desired, wherein said terminal portion has a maximum width adjacent its rearward extremity and said tubular portion elastically grips said terminal portion adjacent the rearward extremity thereof, and wherein said tubular portion has an upper intermediate interior surface and a lower front interior surface which are resiliently biased into contact with said respective one of said bows as a result of said tubular portion bending to conform to said downwardly curved terminal portion, said tubular portion thereby gripping said downwardly curved terminal portion of said respective one of said bows to hold said extender in a desired position thereon.*

*51. The eyewear retainer of claim 50 wherein said tubular portion is of rubberlike material which is non-slippery with respect to the surface of said bow.*

*52. The eyewear retainer of claim 50 wherein at least an intermediate portion of said tubular portion has a thin wall and an upright oval cross-sectional shape when said extender is separate from said respective one of said bows, and wherein at least said intermediate portion of said tubular portion assumes a laterally outwardly bulging shape when said tubular portion is bent to conform to said terminal portion of said respective one of said bows when said extender is in place on said bow.*

*53. The eyewear retainer of claim 50 wherein said tubular portion includes thin wall means for causing said tubular portion to bulge laterally when bent to conform to said downwardly curved terminal portion of said respective one of said bows, and including a front margin which is slanted diagonally downward and forward, defining an opening large enough to receive said paddle-like terminal portion, at said front end of said tubular portion.*

* * * * *

UNITED STATES PATENT AND TRADEMARK OFFICE

CERTIFICATE OF CORRECTION

PATENT NO. : Re. 34,836

DATED : January 24, 1995

INVENTOR(S) : Edmond E. Murrell

It is certified that error appears in the above-identified patent and that said Letters Patent is hereby corrected as shown below:

Col. 9, Line 21: Delete "this" and insert --the same-- in place thereof.

Col. 16, following line 41, insert claim 54 as follows:

*--54. The eyewear retainer of claim 50 wherein said tubular portion is at least four times as long as its own greatest transverse dimension.--*

Signed and Sealed this

Eighteenth Day of April, 1995

Bruce Lehman

*Attest:*

BRUCE LEHMAN

*Commissioner of Patents and Trademarks*

*Attesting Officer*